United States Patent
Grandin-Drevin et al.

(10) Patent No.: US 7,023,982 B1
(45) Date of Patent: Apr. 4, 2006

(54) TELEPHONE PLUG SYSTEM

(75) Inventors: Agneta Grandin-Drevin, Grisslehamn (SE); Anders Drevin, Uppsala (SE); Håkan Drevin, Grisslehamn (SE)

(73) Assignee: Skabboren AB, Grisslehamn (SE)

( * ) Notice: Subject to any disclaimer, the term of this patent is extended or adjusted under 35 U.S.C. 154(b) by 0 days.

(21) Appl. No.: 09/549,997

(22) Filed: Apr. 14, 2000

(30) Foreign Application Priority Data

Apr. 13, 2000 (SE) .................................. 0001375

(51) Int. Cl.
*H04M 1/72* (2006.01)

(52) U.S. Cl. .............................. 379/387.01; 379/167.01

(58) Field of Classification Search ........... 379/387.01, 379/142.12, 142.13, 167.01, 102.02, 171, 379/172, 179, 182–184, 194–195; 455/462; 470/468

See application file for complete search history.

(56) References Cited

U.S. PATENT DOCUMENTS

| | | | |
|---|---|---|---|
| 3,949,172 A | | 4/1976 | Brown et al. |
| 4,270,202 A | * | 5/1981 | Stuttard et al. ............. 370/468 |
| 5,265,154 A | * | 11/1993 | Schotz .................. 379/102.02 |
| 5,911,119 A | * | 6/1999 | Bartholomew et al. ..... 455/402 |
| 5,920,615 A | | 7/1999 | Nolde |
| 5,991,634 A | * | 11/1999 | Hui et al. ................... 455/513 |
| 6,389,125 B1 | * | 5/2002 | Ubowski ............... 379/142.12 |

* cited by examiner

*Primary Examiner*—Sinh Tran
*Assistant Examiner*—Walter F Briney, III
(74) *Attorney, Agent, or Firm*—Ronald A. Sandler; Jones Day (57) ABSTRACT

A telephone plug system includes a jack body having one end adapted to be inserted into standard wall telephone jacks, having at least one receiving socket at another end adapted to receive a conventional plug which is attached to a telephone line operated device. One plug is selected as host plug and at least one as slave plug, whereby the host plug controls a slave plug regarding receiving calls such as speech, facsimile, data etc.

5 Claims, 5 Drawing Sheets

TELEPHONE PLUG SYSTEM

TECHNICAL FIELD

The present invention pertains to a telephone plug system and a telephone plug with a jack body having one end adapted to be inserted into standard wall telephone jacks, having at least one receiving socket at another end adapted to receive a conventional plug which is attached to a telephone line operated device.

BACKGROUND ART

There are problems related to having multiple telephone jacks connected to each other in series (cascaded) or parallel for residential subscribers and the like. An incoming telephone line is connected to a first main jack with a chain of slave jacks connected to it. In some cases all jacks have telephones connected to them. Hence, an incoming call will make all the telephones ring. A person in another room than a receiving off-hook telephone could listen to a conversation without the knowledge of a person who receives the call, which is a kind of eavesdropping.

A more up to date problem concerns that jacks do not only have telephones connected. Other connected devices could be facsimile (fax) machines, modems or the like. When there are multiple connected jacks with all kinds of machines connected such as a fax, it is inconvenient if a person hears a ring signal intended for the fax and believes that it is a phone call and answers the call.

If a telephone is used without knowledge of an ongoing fax call on the line it could disturb or brake the fax transmission depending on how jacks are coupled in a chain and where the off-hook telephone and/or fax is situated in a chain of connected telephone jacks.

In a plurality of countries the jacks for residential subscribers are connected so that every jack is provided with a unique priority. By priority is understood that the jack having the highest priority will break all communication to other telephone devices when off-hooked. A telephone that has the next highest priority will break the connection with all devices having a lower priority then the next highest etc.

To be able to speak in a telephone only two wires (one telephone line) are needed. To every jack in a resident there are two incoming wires to a jack and two outgoing wires. In the jack having the highest priority, the incoming wires are connected to the PSTN (Public Switched Telephone Network) and the outgoing wires to a telephone with the next highest priority and so forth. This creates a chain where every telephone is able to break the chain at off-hook state, thus disconnecting telephone sets with a lower priority.

When no telephone is plugged-in to a jack, the incoming wires and outgoing wires are connected to each other. A plug-in of a telephone will break the chain, whereby the telephone will control break and contact in the chain. Conventionally when a telephone is on-hook a signal will pass through it. When the handset is lifted to an of-hook state the connection between incoming wires and outgoing is interrupted. Hence, disconnecting every telephone with a lower priority.

Today jacks have four connecting terminals and one terminal for an interrupting function. Two of the terminals are used to connect to a telephone, The other two are used to connect to the next telephone in the chain. As mentioned, when no telephone set plug is inserted in a jack, the four terminals are short-circuited. The terminals are divided by the plastic center plug in the connector plug for the telephone when inserted.

If multiple telephonic devices are plugged-in to the same jack, a plug with a body is used which one end is adapted to be inserted into a standard wall telephone jack, and having at least one receiving socket at another end, adapted to receive a conventional plug which is attached to a telephone line operated device.

In some connections, fax machines or modems only work properly if they are connected to the incoming telephone line jack.

When an analogue telephone system is made digital, for example, ISDN, there are still analogue outputs connected that can be used to connect old analogue equipment such as fax, telephone set, modem etc. The present invention provides a smooth change from a analogue telephone system to a digital one.

The U.S. Pat. No. 5,231,658 by Eftechiou discloses a telephone privacy device with a plug-in body for a multiple jack telephone line. Privacy is accomplished through off-hook detection and there is no signaling or control between plug-in bodies via the telephone line.

PCT application WO 92/15 167 discloses a telephone adapter for telephone sets which accomplishes privacy through off-hook detection, and uses a kind of audio signaling.

Patent application document EP-A2-0348 956 describes how privacy is reached by of-hook, lifted line handset, detection.

An off-hook detection for privacy is also disclosed through PCT application WO 95/18502.

SUMMARY OF THE DISCLOSED INVENTION

The present invention relates to a telephone plug-in system for privacy when calling, and for directing incoming fax and other telephone calls to the jack to which a device is connected, by signaling over existing or provided telephone wires not using off-hook detection.

Background art discloses off-hook detection for privacy when calling. It does not solve all the problems related to multiple jacks on a telephone line according to the above. Especially not for devices other than telephone sets.

To solve problems and to achieve aspects of the present invention it sets forth a telephone plug system with a jack body having one end adapted to be inserted into at least one standard wall telephone jack, having at least one receiving socket at another end adapted to receive a conventional telephone plug which is attached to a telephone line operated device. It comprises:

one of said plugs being a host plug and at least one being a slave plug both containing electronics for signaling each other via a provided or existing telephone line connection between multiple jack connections;

said host plug being connected to at least one incoming telephone line;

said host plug and each slave plug having different data addresses for addressing each other during signaling;

said host plug receiving all incoming calls through said at least one incoming telephone line, determining the nature of a call and a device intended for receiving said call, and keeping the call intended for a device connected to it, or distributing the call to a slave plug connected to the determined device, and controlling the function of a slave plug through said signaling; and said host plug controlling a ring signal connected to a call only to ring on plugs where determined devices are connected, and other plugs to put out a line occupation signal in an off-hook state through said addressing thus introducing privacy for all connected telephone operated devices and preventing listening to other calls from said slave plug and preventing ring signals on plugs with connected devices not intended for an incoming call.

In one embodiment of the present invention, the ring signal is distributed to all plugs after a predetermined number of signals at chosen plugs for an incoming call.

In another embodiment a telephone receiving a call distributed to one of said plugs is used to DTMF signaling to the host plug in order to open the line for other slave plugs or to make a system internal call.

One embodiment comprises that said nature of a call is determined by said host plug through a tone listening or a comprised Call-ID function.

A further embodiment comprises that a slave plug that has demanded the line enters a watch state, whereby a tone for a non occupied telephone line is distributed to a buzzer comprised in said plug when a call is ended.

A still further embodiment comprises that a telephone device for DTMF signaling connected to one of said plugs is used to program a plug through its key pad using said signaling.

Further, the present invention sets forth a telephone line plug, which function is controlled via signaling over a provided telephone line using a single incoming line, with a jack body having one end adapted to be inserted into standard wall telephone jacks, having at least one receiving socket at another end adapted to receive a conventional plug which is attached to a telephone line operated device. It is comprising:
- a first central processor unit for controlling signaling and the comprised means in said plug;
- a switch state determining means for isolating an incoming telephone line from an outgoing in said plug; a line sensor means, determining if the telephone line is requested by a device connected to the outgoing telephone line;
- a communication channel means between a host plug and a slave plug;
- a tone generator means for generating tones connected to the outgoing telephone line;
- a buzzer used for signaling;
- a identification means providing a plug its identity in a plug system;
- a power status controlling means; and
- thus making up a slave plug for a single incoming telephone line in a plug system controlled via signaling over a provided telephone line.

In one embodiment it is making up a separate unit or a block comprised in a host plug, said host plug comprising:
- a second central processor unit for controlling signaling and the comprised means in said plug;
- a type of call determining means;
- a calling number determining means; a line sensor means differing between an idle state and an active state of the telephone line, and detecting a ring signal;
- a line holding means providing the second processor unit to put the telephone line into an idle state or an active state;
- a first tone generating means used to generate tones to be transmitted to a calling party;
- a switch state determining means used to isolate an incoming line from an outgoing line;
- a second tone generating means used to generate tones internally in said telephone line system;
- a line sensor means. determining if a connected telephone device is using said telephone line;
- a communication means making up a communication channel to said slave plug;
- a power supply, which provides voltage internally in said telephone line system when said switch state has disengaged the incoming telephone so that said line to said connected telephone device still resembles a conventional telephone line;
- a ring signal generating means used to generate ring signals in said telephone line system; and
- a DTMF decoder, which decodes DTMF tones transmitted from telephone devices connected in the system.

A further embodiment comprises that said calling number determining means are Call-ID or calling party identification means.

A still further embodiment of the present invention comprises that Call-ID or calling party identification and the CPU uses Call-ID or calling party identification control to handle any type of Call-ID or calling party identification, such as Frequency Shift Keyring and Dual Tone Modulated Frequency.

The present invention further sets forth a telephone line plug, which function is controlled via signaling over a provided telephone line using at least two incoming telephone lines, with a jack body having one end adapted to be inserted into standard wall telephone jacks, having at least one receiving socket at another end adapted to receive a conventional plug which is attached to a telephone line operated device. It is comprising:
- a first central processor unit for controlling signaling and the comprised means in said plug;
- a first modulator/demodulator means modulating every signal with a chosen frequency for a line in question, whereby said first central processor determines which carrier wave it has to use;
- a line sensor means differing between an idle state and an active state of the telephone line, and detecting a ring signal;
- a communication channel means making up a communication channel to said slave plug;
- a tone generator means for generating tones connected to the outgoing telephone line;
- a first buzzer used for signaling;
- an identification means providing a plug its identity in a plug system;
- a power status controlling means;
- a ring signal generating means to said line with a connected telephone device in an idle state;
- a DTMF decoder means, which decodes DTMF tones transmitted from telephone devices connected in the system;
- a power supply means generating the voltage corresponding to a conventional telephone line voltage; and thus making up a slave plug for multiple incoming telephone lines in a plug system controlled via signaling over a provided telephone line.

In another embodiment the plug is making up a separate unit or a block comprised in a host plug for at least two incoming telephone lines, said host plug comprising:
- at least two second central processor units for controlling signaling and the comprised means in said plugs;

at least two line sensor means differing between an idle state and an active state of the telephone line, and detecting a ring signal;

at least two line holding means providing a second processor unit to put a telephone line into an idle state or an active state;

at least two second tone generating means used to generate tones to be transmitted to a calling party;

at least two communication channel means making up a communication channel to said slave plug;

a power supply for all connected slave plugs;

at least two second modulator/demodulator means modulating every signal with a chosen frequency for a line in question, whereby said first central processor determines which carrier wave it has to use;

a system bus for communication and control between said second central processor units;

at least two determining means for type of call; and at least two calling number determining means.

Another embodiment of the present invention comprises that said calling number determining means are Call-ID or calling party identification means.

A further embodiment comprises that Call-ID or calling party identification and the CPU uses Call-ID or calling party identification control to handle any type of Call-ID or calling party identification, such as Frequency Shift Keying and Dual Tone Modulated Frequency.

The telephone line plugs described above are also used in the embodiments of the above described system in accordance with the attached set of system sub-claims.

BRIEF DESCRIPTION OF THE DRAWINGS

Henceforth reference is had to the accompanying drawings for a better understanding of the examples and embodiments described, wherein.

DETAILED DESCRIPTION OF PREFERRED EMBODIMENTS

One aim with the plugs according to the present invention is to improve and replace a priority chain as described in the prior art. Important advantages following the plug according to the invention are set out below:

No disconnected modem calls.

Privacy during a telephone call.

No fuzz with today plug-in devices and faulty connected telephone sets which can disconnect every connected set in a chain.

Enhanced functionality

Such as;

Exchange functionality, due to plugs with different identities, controlling and distributing a call to selected plugs. A calling party is able to connect to a preferred plug in a system according to the present invention by the use of a telephone equipment's DTMF tone dialing. It is also possible to block programmed outgoing numbers and incoming numbers.

Line-sharing by controlling fax, data, speech to different plugs.

Call-ID) or calling party identification control.

A system according to the present invention is received with, for example, one host plug and two or more slave plugs. It is easy to plug-in the plugs with the host plug in a first jack for the incoming telephone line and slave plugs to other jacks.

If a residential telephone is connected in parallel, the jack in which the host plug is to be connected has to be rearranged with regard to the line connection.

Figure 1:
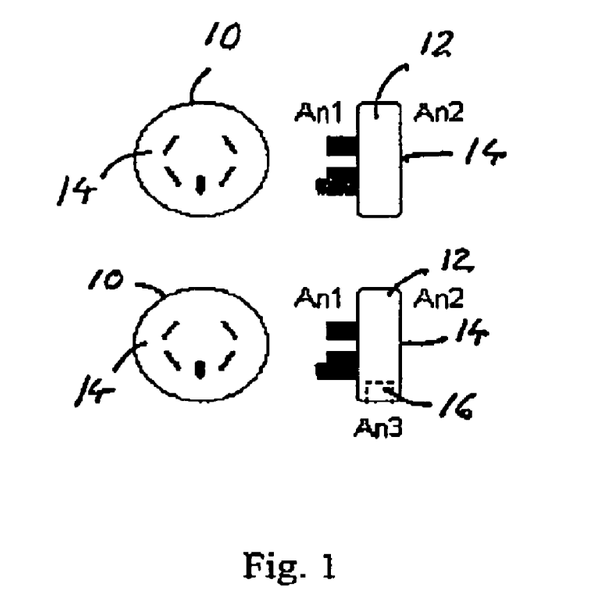
FIG. 1 schematically illustrates a telephone line plug-in device according to one embodiment of the present invention.

Although the present invention is described with a jack according to FIG. 1, it also works for other types of jacks such as TP-jacks.

FIG. 1 schematically illustrates a telephone line plug-in device 10, according to one embodiment of the present invention, in a front view and a side elevation view in two possible versions above and below.

The above version in FIG. 1 depicts a telephone plug 10 with a jack body 12 having one end An1 adapted to be inserted into standard wall telephone jacks, having a receiving socket 14 at another end An2 adapted to receive a conventional plug which is attached to a telephone line operated device for fax, data, speech. A below version of a jack body 12 depicts the same features as the above version except for an additional receiving socket An3, denoted 16, and being a TP-jack receiving socket. The receiving socket An1 could also be adapted with a telephone line cord comprising a plug to be inserted in a standard wall jack.

Figure 2:
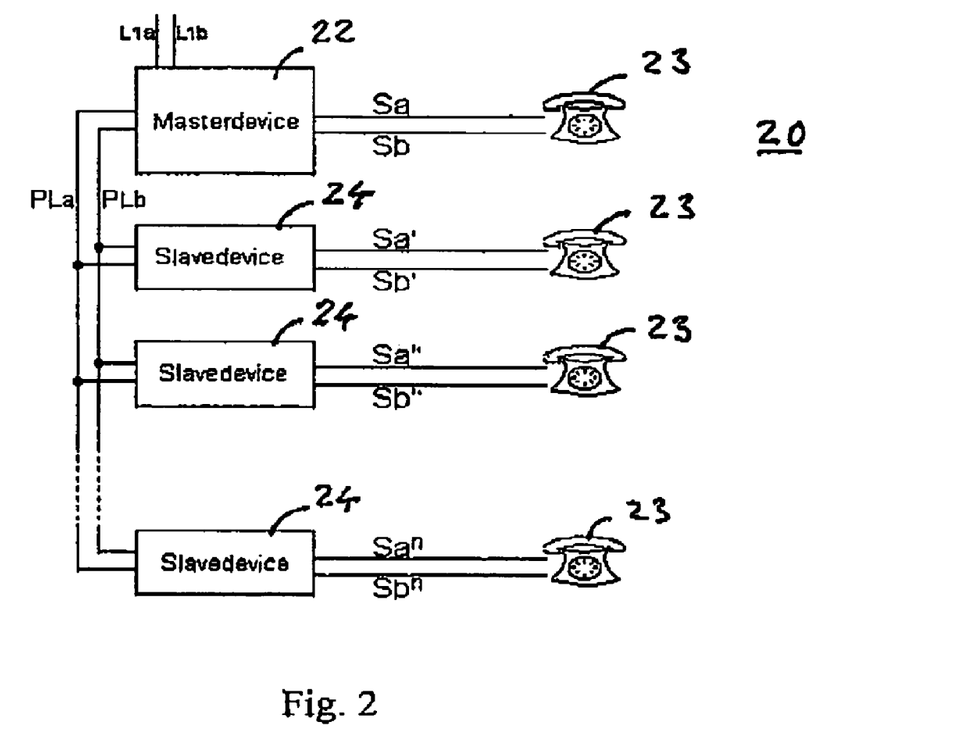
FIG. 2 schematically illustrates a one line plug-in system according to the present invention.

In FIG. 2 is schematically illustrated a one line plug-in system 20 according to the present invention with a host plug 22 (master plug) connected to the incoming telephone wires L1a and L1b, respectively. A telephone set 23 is connected to its receiving socket 14 via wires Sa and Sb, Sa' and Sb' etc. Multiple slave plugs 24 or devices are connected to the host plug 22 through outgoing telephone wires P1a and P1b, respectively.

Figure 3:
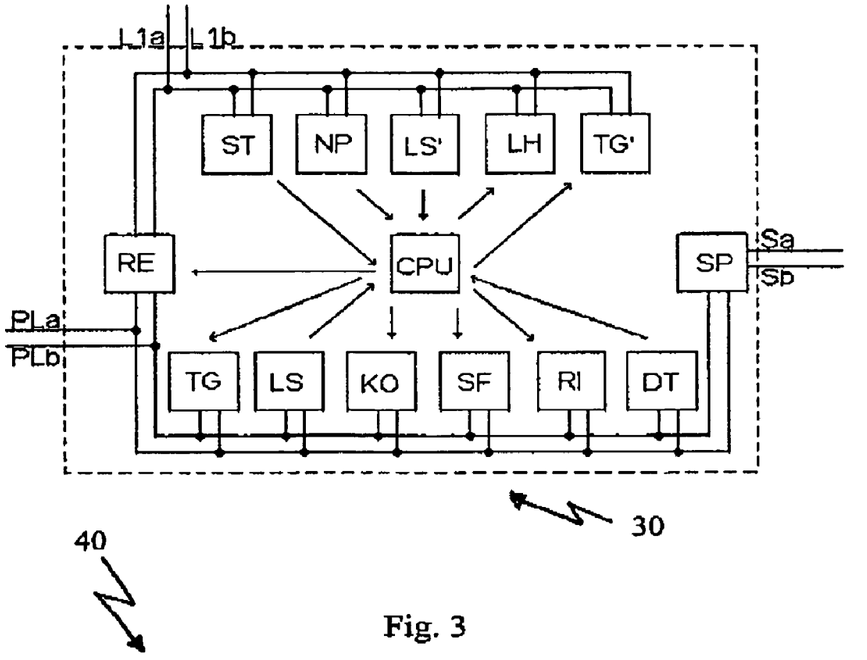
FIG. 3 schematically illustrates a host plug according to the present invention.

FIG. 3 schematically illustrates a host plug according to the present invention. The block diagram in FIG. 3 describes a principal design of a host plug 30. Arrows in the diagram depict the direction of communication between the CPU, Central Processor Unit. As the CPU is controlling the plug 10, here a host plug, communication or co-operation between blocks in the block diagram is accomplished through the CPU. The block diagram comprises the following blocks:

ST Type of call. Via ST the CPU differs among the type of calls speech, data and fax.

NP Call-ID or calling party identification. NP receives Call-ID or calling party identification and the CPU uses NP for Call-ID or calling party identification control. NP is designed to handle any type of Call-ID or calling party identification, such as FSK (Frequency Shift Keying and DTMF (Dual Tone Modulated Frequency).

LS' Line sensor. LS' differs between an idle state and an active state of the telephone line. It is also able to detect a ring signal.

LH Line holding (seizing). Via LH, the CPU is able to put the line into an idle state or an active state.

TG' Tone generator. TG' is used to generate all kinds of tones to be transmitted to a calling party such as occupied line tone, connecting tone etc. The CPU controls the type of tone, for example frequency.

RE Switch (relay). RE is used to divide wires L1a/L1b and PLa/PLb.

SP Slave plug.

TG Tone generator used to generate tones such as busy tone, dial tone etc for tones transmitted, internally, in the system of the present invention. The CPU determines the frequency etc. of the tones.

LS Line sensor, determining if a telephone device connected to the PLa/PLb line is using the telephone line.

KO Communication. Makes up a communication channel between a host plug and a slave plug.

SF Power supply, which provides voltage on the PLa/PLb line when RE has disengaged L1a/L1b so that PLa/PLb still resembles a conventional telephone line.

RI Ring signal generator, generating ring signals to the line PLa/PLb. Note! RI generates ring signals to line PLa/PLb in an idle state in contradiction to RI', which generates ring signals when line L1a/L1b is in an active state. The CPU determines the frequency etc. of the ring signal.

DT DTMF decoder, which decodes the DTMF tones transmitted from telephone devices connected in the system (internal). This is used, for example, to conduct internal telephone calls (in-house).

Figure 4:
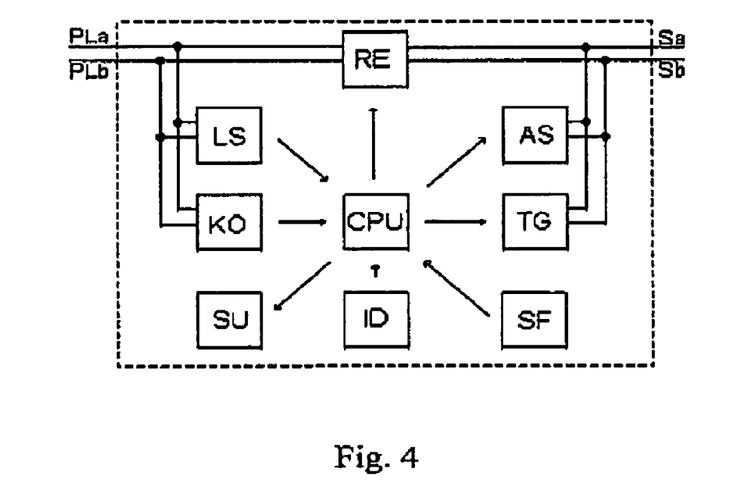
FIG. 4 schematically illustrates a slave plug according to the present invention.

FIG. 4 schematically illustrates a slave plug according to the present invention through a block diagram 40. The block diagram in FIG. 4 depicts a general principal design of a slave plug according to the present invention. Arrows depict the direction of communication between CPU and comprised blocks. Co-operation between the blocks is controlled via the CPU. The block diagram 30 comprises the following blocks:

RE Switch (relay) used by the CPU to connect or disconnect the, via Sa/Sb connected, devices from wires PLa/PLb.

LS Line sensor, which senses the line status, i.e., ongoing call or not. Also the CPU can tamper ring signals via LS.

AS Line sensor, used by the CPU to determine if a device connected to said plug is using the outgoing line.

KO The same function as KO for the host plug.

TG The same function as TG for the host plug.

SU Buzzer, used for signaling features.

ID Identification, which provides an identity in the system for a slave plug. The identity is used by call directing. ID=0 could mean fax, ID=1 could mean data. Further ID's can be provided as needed.

SF Power supply, which the CPU can use to determine the status of the power supply. If the slave plug is battery charged it can be determined if the battery status is OK or not.

Figure 5:
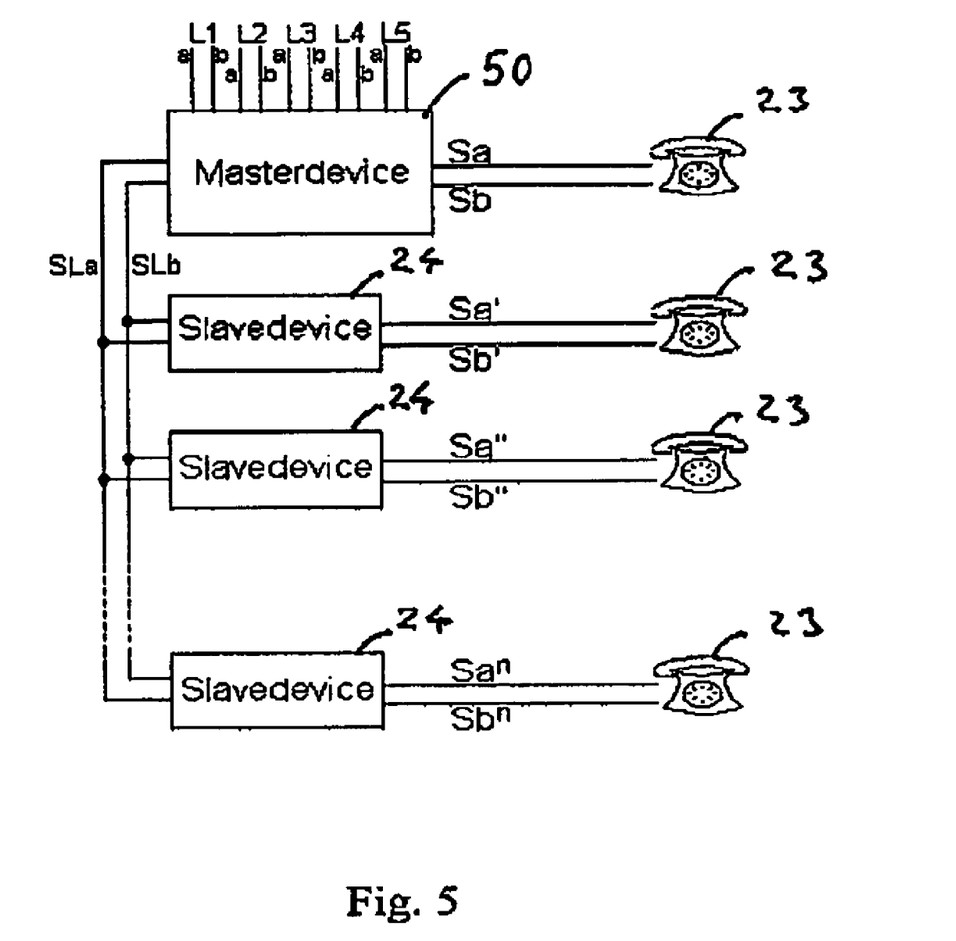
FIG. 5 schematically illustrates a multiple line plug-in system according to the present invention.

FIG. 5 schematically illustrates a multiple line L1 to L5 plug-in system according to the present invention. It resembles the block diagram in FIG. 2 except for the multiple wires L1–L5 connected to the host plug 50.

Figure 6:
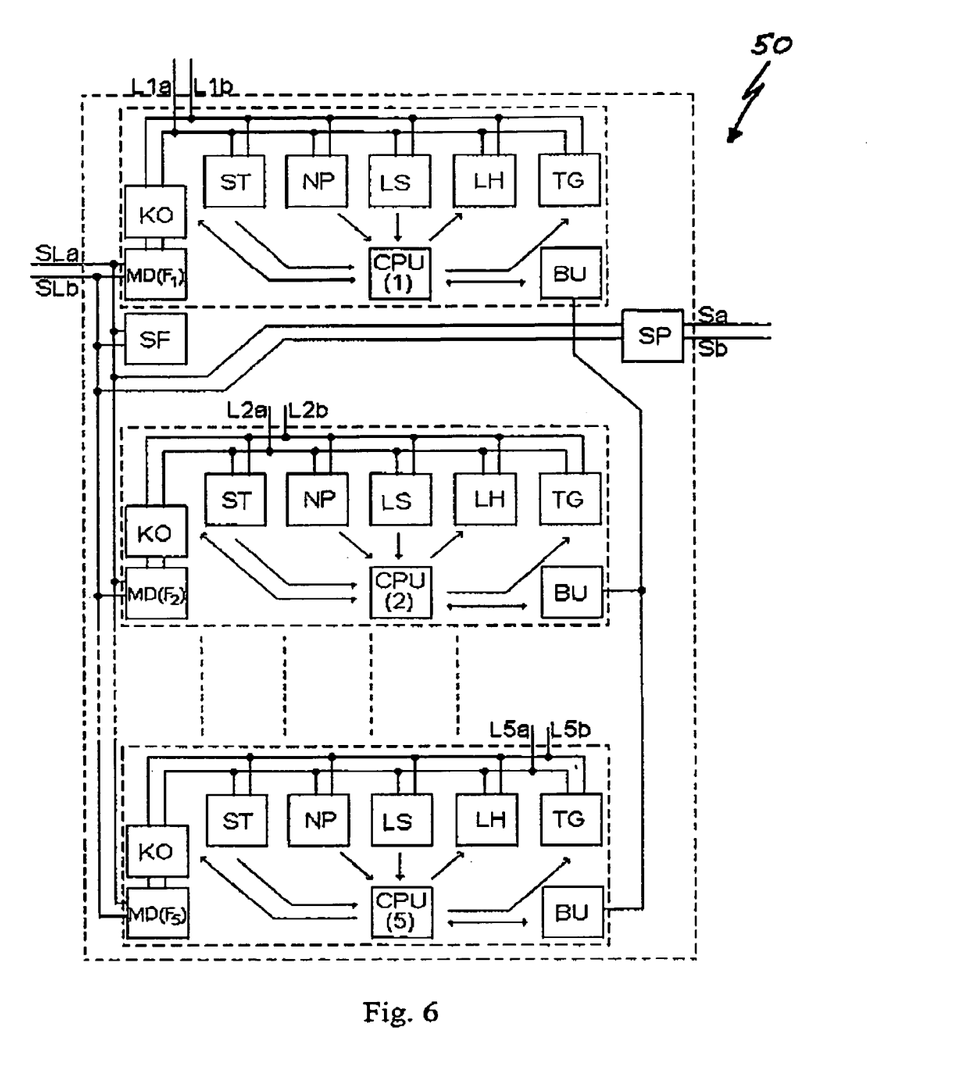
FIG. 6 schematically illustrates a multiple line host plug according to the present invention.

FIG. 6 schematically illustrates a multiple line host plug according to the present invention. The block diagram describes the principal design of a multiple host plug 50. Depicted arrows show in which direction CPU1 to CPU5 communicate with comprised function blocks. Each CPU controls one incoming line.

In this embodiment of the present invention five modulator/demodulator $MD(F_1)$ to $MD(F_5)$ demodulate the different wires incoming signals with different frequencies in order to make a simultaneous communication possible on every incoming line, five wires in this embodiment, L1a/L1b–L5a/L5b, on the internal line SLa/SLb.

The block diagram of the multiple line host plug comprises the following blocks. Blocks which are described in accordance with the one line host plug of FIG. 3 are not repeated.

MD Modulator/Demodulator. Five telephone wires, L1a/L1b–L5a/L5b, are to share the line SLa/SLb to other slave plugs, and to be used simultaneously in a worst case with five incoming calls. Hence, every telephone line is modulated with predetermined frequencies $F_1$ to $F_5$. A modulator MD modulates every signal with a chosen frequency (channel) for the line in question. Telephone line 1 is modulated with predetermined frequencies, one frequency for every direction, from and to the host plug 50, i.e., two frequencies $F_1$ for every telephone line, the telephone line 2 with two frequencies $F_2$, etc.

CPU Processor. As pointed out one, CPU1–CPU5, processor is used to control one telephone line.

BU System bus, provided for internal communication between the different telephone line CPUs.

SF Power supply. In the multiple line version of the host plug, the stave plugs are power supplied by the host plug 50 via the line SLa/SLb.

Figure 7:
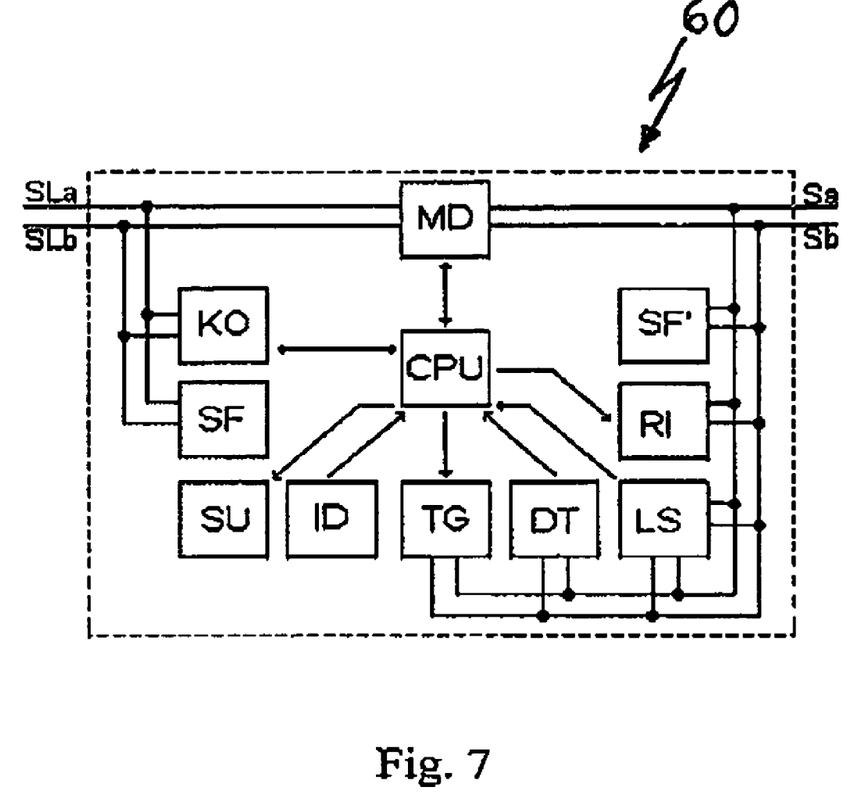
FIG. 7 schematically illustrates a multiple line slave plug according to the present invention.

FIG. 70 schematically illustrates a multiple line slave plug block diagram 60 according to the present invention, whereby arrows show in which direction the internal CPU communicates with comprised function blocks. Said block diagram comprises the following blocks. Blocks which are described in accordance with the one line slave plug of FIG. 4 are not repeated.

MD Modulator/Demodulator. As for the multiple line host plug 50, the multiple line slave plug 60 has to handle that five telephone wires, L1a/L1b–L5a/L5b, are to share the line SLa/SLb to other slave plugs and the host plug 50, and to be used simultaneously. In a worst case with five incoming calls. Hence, every telephone line is modulated with a predetermined frequency $F_1$ to $F_5$. A modulator MD modulates every signal with a chosen frequency (channel) for the line in question. Telephone line 1 is modulated with predetermined frequencies, one frequency for every direction, from and to the host plug 50, i.e., two frequencies $F_1$ for one telephone line, the telephone line 2 with two frequencies $F_2$, etc. The CPU in the slave plug 60 determines which carrier wave, $F_1$–$F_5$, MD bas to use.

SF' Power supply generates the voltage corresponding to a conventional telephone line voltage, 48 V in Sweden.

RI Ring generator. RI supports the CPU to generate ring signals on the outgoing line Sa/Sb. The CPU determines, for example, the frequency of the ring signal.

TG Tone generator used to generate tones such as busy tone, dial tone etc. for tones transmitted, internally, in the system of the present invention. The CPU determines the frequency etc. of the tones.

DT DTMF receiver. DT recognizes DTMF tones sent via Sa/Sb connected DTMF compatible telephone equipment, and is used to transmit control commands to a slave plug 60 and to program it.

Blocks set out above make up means provided through software and hardware or a combination of software and hardware known to a person skilled in the art, providing the unique features of the present invention.

Although the present invention has been described through preferred embodiments, its scope is not limited to those. The attached set of claims provides other possible embodiments of the invention for a person skilled in the art.

What is claimed is:

1. A telephone line plug system comprising:

A jack body having one end adapted to be inserted into standard telephone wall jacks, said jack body having at least one receiving socket at another end adapted to receive a conventional plug which is attached to a telephone line operated device, said plug being controlled via signaling over a provided two wire telephone line;

a first central processor unit for controlling said signaling;

a first modulator/demodulator for modulating every signal with a chosen frequency for a line in question, wherein said first central processor unit determines which carrier wave to use;

a line sensor for differentiating between an idle state and an active state of the telephone line, and for detecting a ring signal;

a communication channel for forming a communication channel to a slave plug;

a tone generator for generating tones connected to an outgoing telephone line;

a first buzzer for signaling, an identification means for providing a plug its identity in a plug system;

a power status controlling means;

a ring signal generating means connected to a line with a connected telephone device in an idle state;

a DTMF decoder for decoding DTMF tones transmitted from connected telephone devices; and a power supply for generating voltage corresponding to a conventional telephone line voltage wherein a slave plug is provided for multiple incoming telephone lines in a plug system controlled via signaling over a provided two wire telephone line.

2. A plug system according to claim 1 further comprising:

second and third central processor units for controlling signaling from at least two incoming two-wire telephone lines;

at least two line sensors for differentiating between an idle state and an active state of the telephone lines, and detecting a ring signal;

at least two line holding means for providing either said second or said third processor unit to put a telephone line into an idle state or an active state;

at least two second tone generating means for generating tones to be transmitted to a calling party;

at least two communication channels for providing communication channels to a plurality of slave plugs;

a power supply for all connected slave plugs;

at least two second modulator/demodulator for modulating every signal with a chosen frequency for a line in question, wherein one of said central processor units determines which carrier wave to use;

a system bus for communication and control between said second and said third central processor units;

at least two determining means for determining a type of call; and at least two calling number determining means.

3. A plug system according to claim 1, wherein said calling number determining means are Call-ID or calling party identification means.

4. A plug system according to claim 3, wherein Call-ID or calling party identification and the central processor units use Call-ID or calling party identification control to handle any type of Call-ID or calling party identification, including Frequency Shift Keying and Dual Tone Modulated Frequency.

5. The plug system according to claim 1 including:

means for determining the status or type of an incoming call by listening to a tone.

* * * * *